March 27, 1956     O. V. SAUNDERS     2,739,456

TWO TEMPERATURE REFRIGERATOR

Filed July 21, 1953     3 Sheets-Sheet 1

INVENTOR.
Orson V. Saunders
BY R. R. Candor.
Attorney

March 27, 1956 O. V. SAUNDERS 2,739,456
TWO TEMPERATURE REFRIGERATOR
Filed July 21, 1953 3 Sheets-Sheet 2

INVENTOR.
Orson V. Saunders
BY
R. R. Candor.
Attorney

March 27, 1956  O. V. SAUNDERS  2,739,456
TWO TEMPERATURE REFRIGERATOR
Filed July 21, 1953  3 Sheets-Sheet 3

INVENTOR.
Orson V. Saunders
BY
R. R. Candor.
Attorney

United States Patent Office

2,739,456
Patented Mar. 27, 1956

2,739,456
TWO TEMPERATURE REFRIGERATOR

Orson V. Saunders, Dayton, Ohio, assignor to General Motors Corporation, Detroit, Mich., a corporation of Delaware Application July 21, 1953, Serial No. 369,373

14 Claims. (Cl. 62—103)

This invention relates to refrigeration and particularly to the construction of a refrigerator of the multiple different temperatured compartment type.

In refrigerators having separate compartments therein maintained at different temperatures relative to one another, such as a freezing food storage compartment and an unfrozen food storage compartment, the low temperature of a refrigerant evaporator of a refrigerating system utilized to cool the interior of the frozen food compartment, in spite of being well insulated from the unfrozen food compartment, transmits low temperature through an insulated wall enclosing the same and exposed to the unfrozen food compartment. The temperature of this wall at times becomes much colder than the temperature maintained in the unfrozen food compartment and causes moisture in the air within the unfrozen food compartment to condense on the outer surface of the frozen food compartment wall exposed to the interior of the unfrozen food compartment. If a positive air circulation from the warmer or unfrozen food compartment can be maintained over the cold wall of the frozen food compartment, exposed to the interior of the unfrozen food compartment, the moisture accumulated thereon will be warmed and prevented from freezing thereon and may therefore be drained away from the same. I therefore contemplate the provision of means associated with an insulated wall of a freezing or frozen food storage compartment exposed to the interior of an unfrozen food storage compartment in a refrigerator cabinet that will cause circulation of relatively warm air over the exterior surface of the insulated wall and will also serve as a drip tray for receiving water dripping therefrom.

An object of my invention is to provide an improved mechanical refrigerator which can be manufactured at low cost and will overcome difficulties encountered in the construction of refrigerators of the type wherein two separately insulated and different temperature compartments are incorporated in a single cabinet.

Another object of my invention is to provide a baffling arrangement for the outer wall of an insulated freezing compartment exposed to the interior of a higher temperature food storage compartment in a refrigerator cabinet which will, in addition to forming a flue for causing air from the higher temperature compartment to flow across and into contact with this exposed wall, serve to receive condensate water dripping therefrom and to convey the water to a point where it may flow out of the cabinet.

A further object of my invention is to provide a refrigerator having a frozen food compartment cooled by a freezing evaporator and an unfrozen food storage compartment cooled by a frosting and defrosting evaporator within a single chamber of a cabinet with means which in addition to directing and draining condensate water resulting from defrosting the evaporator of the frozen food compartment out of the insulated space about the freezing evaporator also forms a common support for the frozen food compartment forming liner and partition or other parts of the cabinet associated therewith from the upper edge portions of an open top liner forming walls of the unfrozen food compartment.

A still further and more specific object of my invention is to provide an improved multiple compartment refrigerator wherein a non-metallic rail secured to and extending around sides of the upper edge portion of an open top unfrozen food compartment forming liner in addition to supporting another or frozen food compartment liner and other cabinet parts above the open top liner is also formed to provide a trough for receiving condensate water from walls of the frozen food compartment liner and the insulated space adjacent thereto and conducting this water into the unfrozen food compartment therebelow.

Further objects and advantages of the present invention will be apparent from the following description, reference being had to the accompanying drawings, wherein a preferred form of the present invention is clearly shown.

Figures 1, 2:
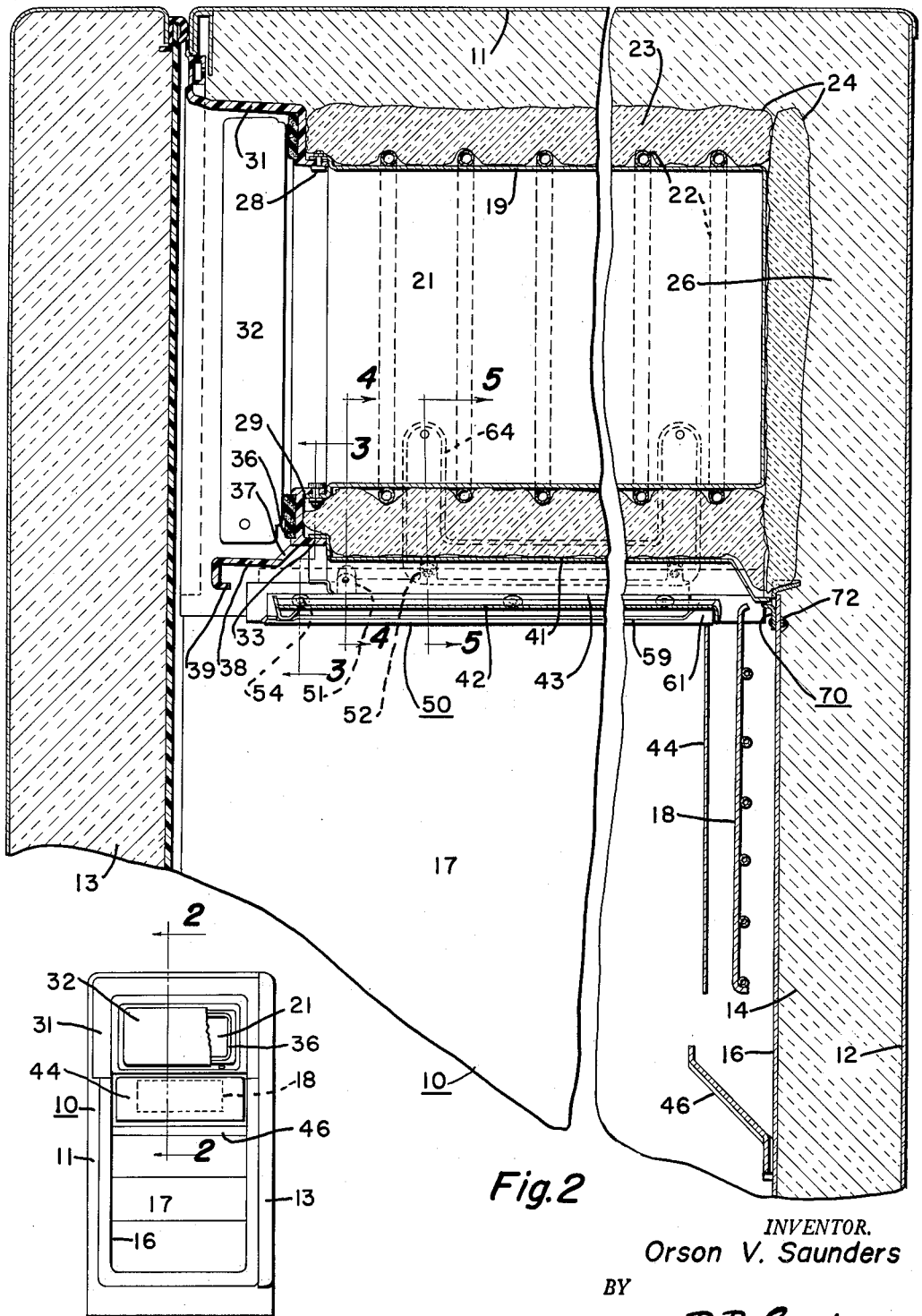
Fig. 1 is a front view of a multiple compartment refrigerator cabinet having my invention embodied therein.
Fig. 2 is an enlarged broken fragmentary vertical sectional view of the refrigerator shown in Fig. 1 and is taken on the line 2—2 thereof.

The present invention is an improvement over the structure disclosed in the copending application of Clifford H. Wurtz, Serial No. 287,140, filed May 10, 1952, entitled "Plural Refrigerated Compartments With Condensate Disposal Means," now Patent No. 2,672,027, dated March 16, 1954, and assigned to the assignee of this application.

I have shown in the drawings a multiple compartment two temperature refrigerator cabinet of the household type wherein one compartment thereof is employed to freeze substances and store frozen foods and its other compartment is utilized for the storage of less perishable food products and left-over foods from the table. In this type of refrigerator, it is customary not to defrost the evaporator which cools the interior of the frozen food compartment and to recommend that frost accumulated on the inside of this compartment be scraped therefrom as is the practice in ice cream storage and the like cabinets. Although the freezing evaporator employed to cool the frozen food storage compartment is not intended to be defrosted, there are nevertheless times when the refrigerating effect of the evaporator will cease and it will defrost. A housewife, unaware of the consequence hereinafter described, may disconnect the electric circuit leading to the refrigerator. Also, the electric circuit may be accidentally opened or broken such as is caused by power line failure during summer storms or by workmen of electric power supplying companies changing or altering the power mains. In either event, the temperature of the evaporator of the refrigerating system associated with the refrigerator cabinet and utilized to cool the frozen food compartment will increase above 32° F. and the layer of frost or ice accumulated on the evaporator or on walls of the frozen food compartment, by moisture entering the insulated space of the cabinet about this compartment, will thaw and melt. This defrosting or condensate water must be conducted out of the insulated spaces about the frozen food compartment to prevent damage to parts of the refrigerator cabinet and the creating of stench or foul odors.

Referring now to Fig. 1 of the drawings the refrigerator cabinet, generally represented by the reference character 10, has a metal shell or housing 11 forming the outer top and side walls thereof and a back wall 12 (see Fig. 2) welded or suitably secured to the shell 11 to provide a chamber in the cabinet having a forwardly facing access opening. An insulated door structure 13 hingedly mounted upon the cabinet shell 11 normally closes the access opening of the chamber within the cabinet. Unpackaged or unbagged substantially loose insulating material 14 is placed within the chamber against the inner surface of the back and side walls of the cabinet outer shell or housing 11. Thereafter an open top metal liner 16 is inserted into the lower portion of the chamber of the cabinet housing and this liner forms walls of an unfrozen food storage compartment 17. Means for cooling the interior of compartment 17 is provided and this means is, in the present disclosure, in the form of a plate-like evaporator 18 located within the compartment and mounted in any suitable or desirable manner upon and in spaced relation to the back wall of liner 16. This plate evaporator 18 may be formed of superimposed and bonded together embossed metal sheets or it may be in the form herein shown comprising a single metal plate having a refrigerant evaporating conduit coil brazed to the rear side thereof. Evaporator 18 is a frosting and defrosting evaporator which cools and causes circulation of air in compartment 17 and maintains the temperature therein above 32° F. Any suitable or conventional method of or apparatus for causing periodic defrosting of the plate evaporator 18 may be employed. The open top liner 16 is disposed a substantial distance below the top wall of the cabinet outer shell 11 so as to permit the formation of a freezing or frozen food storage compartment in the upper portion of the chamber provided by the cabinet shell or housing 11. A second metal liner in the form of a can-like member 19 forms walls of the frozen food compartment 21 in the upper part of cabinet 10. The can-like member 19 has an open front, is located above the open top liner 16 and has its top, sides and back spaced inwardly of the outer top and side walls 11 and back wall 12 of cabinet 10. Liner or can-like member 19 is supported in the upper portion of cabinet 10 in a manner to be hereinafter described. A low temperature or freezing evaporator in the form of a conduit 22 provides refrigerant evaporating passages around the frozen food compartment 21 since this conduit is wrapped or coiled around the can-like member 19 and is secured in intimate thermal contact therewith. Evaporator 22 is adapted to maintain the interior of compartment 21 well below 32° F. at all times. The evaporators 18 and 22 are preferably, although not necessarily, connected in series with one another and in closed circuit relation with a refrigerant translating device of a refrigerating system (not shown) usually mounted in a machine compartment in the bottom of cabinet 10. Such an arrangement is now common and well-known to those skilled in the art and for this reason no further exemplification of the type of the refrigerating system employed to cool the present multiple temperature compartment cabinet is necessary.

The frozen food compartment forming can-like member 19 and the refrigerant evaporator 22 around the same are surrounded by a layer of insulating material in bagged or packaged form. This bagged insulating material comprises glass or mineral wool 23 hermetically sealed within flexible casings or packages such as the bags 24 of some suitable plastic material. I have found that these bags can be made of polyethylene or polyvinylidene chloride which prevents breathing of air into or out of the insulation disposed therein. Any other ordinary or conventional insulating material, as indicated at 26, is placed between the bagged insulation about the can member 19 and the outer cabinet walls. Thus the space between walls of frozen food compartment 21 and the cabinet outer walls or shell 11 and cabinet back wall 12 is substantially filled with insulating material. The surface of bags 24 containing the insulation 23 are pressed closely against the evaporator conduits 22 and against the back wall of can member 19. It is, of course, desirable to block access of moisture to freezing evaporator 22 as much as possible and to prevent any moisture from entering the bagged insulation. It will be appreciated, however, that it is a production impossibility, without involving great expense, to prevent the infiltration of some air and moisture to the cold surface of evaporator 22 and to the outer surface of walls of the can-like member 19.

The edges of liner or can member 19 at the open front thereof are mounted by screws or the like 28 (see Figs. 2 and 3) to a flange 29 formed integrally on a non-metallic and preferably molded plastic breaker strip or collar 31 which has its sides and top attached to the cabinet outer walls or shell 11 in any suitable and now conventional manner. A closure member or door 32, within the chamber of cabinet 10, is hingedly mounted upon breaker strip collar 31 in any suitable manner and normally closes the open front or access opening of the frozen food compartment 21. The lower horizontal part of non-metallic strip or collar 31 is provided with an integral inwardly directed flange 33 for a purpose to be presently described. The outer part of collar or strip 31, opposite the flanges 29 and 33, is provided with a recessed channel which extends entirely around the front of the frozen food compartment 21 and contains a foam rubber or the like sealing gasket or cushion 36 against which the closure member 32 abuts to seal the access opening of compartment 21. This gasket or cushion 36 may be clamped or cemented in channel 34 in any suitable or desirable manner. The lower horizontal part of strip or collar 31 is provided with an integral lip projecting downwardly and forwardly away from the can member 19 or compartment 21. This lip includes an angular portion, provided with a plurality of elongated openings 37 (see Figs. 2 and 3), a flat portion 38 and a down-turned front portion 39. Flat portion 38 of the lip is inclined from the horizontal downwardly toward the openings 37 for a purpose to be hereinafter described. A ceiling or partition 41, upon which the insulation bag beneath member 19 rests, is spaced from the bottom wall of can member 19 of compartment 21 and has its front edge secured to and supported upon the flange 33 on breaker strip collar 31. The insulating material substantially fills the space between the bottom wall of liner member 19 and the dividing partition 41. A pan-like element 42 substantially co-extensive with the partition 41 and spaced therebelow is supported within the upper portion of unfrozen food compartment 17 and forms the top wall thereof. Pan element 42 forms the bottom wall of a horizontal flue, indicated at 43, beneath partition 41 for a purpose to be hereinafter described. It will be noted that the front edge of pan element 42 is spaced rearwardly of the downwardly projecting portion 39 of the lip formed on strip or collar 31 and provides an inlet air opening for the flue 43. The rear edge of pan element 42 is spaced from the back wall of liner 16 and overlaps a vertical baffle 44 mounted in any suitable manner in front of evaporator 18 along the back of compartment 17 to provide a vertical portion and a lower air outlet opening for flue 43. A trough 46, secured to liner 16, below evaporator 18 and baffle 44, at the back of compartment 17, extends into this compartment to a point inwardly of the bottom edge of baffle 44.

Figure 6:
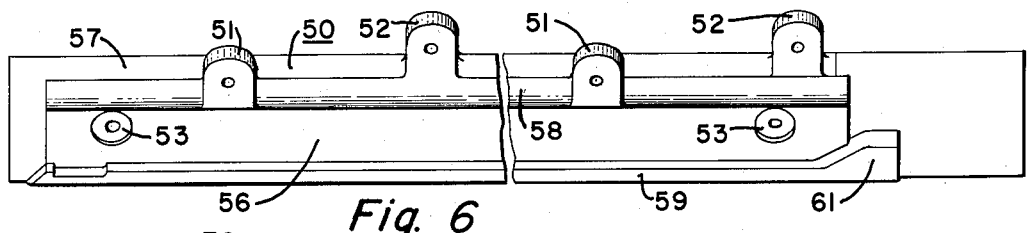
Fig. 6 is a detail side view of a left-hand piece of the supporting rail disclosed in Fig. 2.
Figure 7:
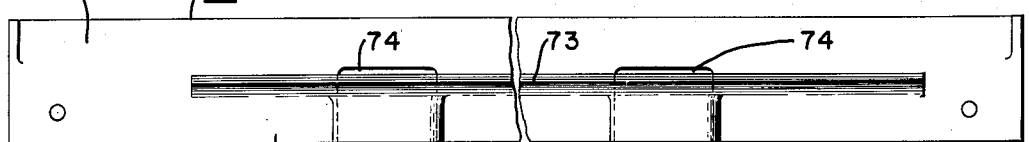
Fig. 7 is a detail side view of a back piece of the supporting rail disclosed in Fig. 2.
Figure 3:
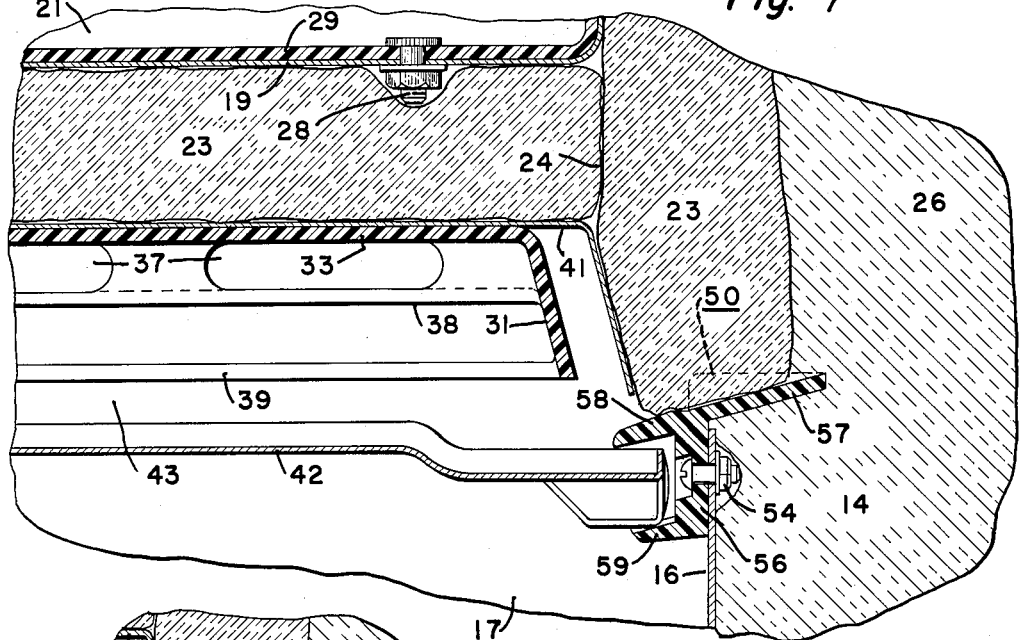
Fig. 3 is an enlarged sectional view taken on the line 3—3 of Fig. 2 showing the mounting of a supporting rail upon an open top liner of one of the compartments in the refrigerator.
Figure 8:
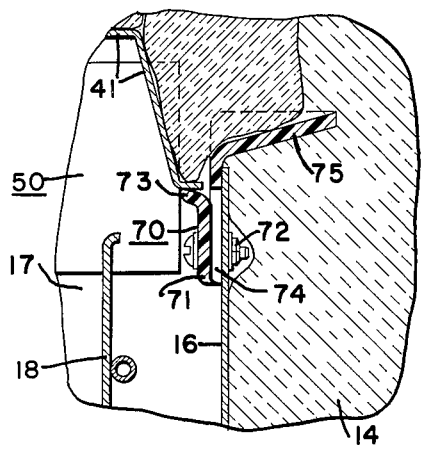
Fig. 8 is an enlarged fragmentary vertical sectional view of the back piece of the supporting rail on the upper edge of the open top liner and showing a relief or drain opening provided in this back piece.
Figure 4:
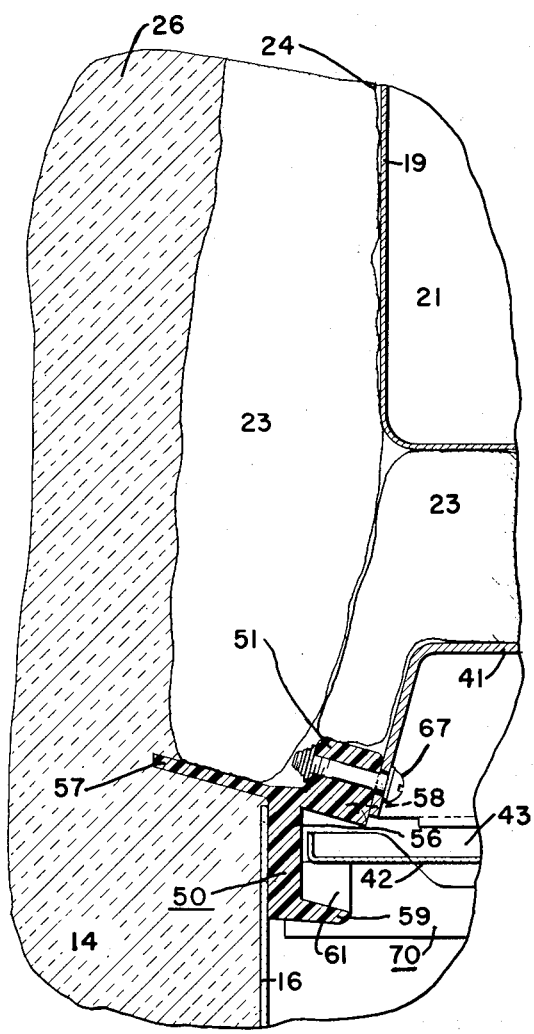
Fig. 4 is an enlarged vertical sectional view taken on the line 4—4 of Fig. 2 showing a partition having a portion thereof secured to and supported from the supporting rail.
Figure 5:
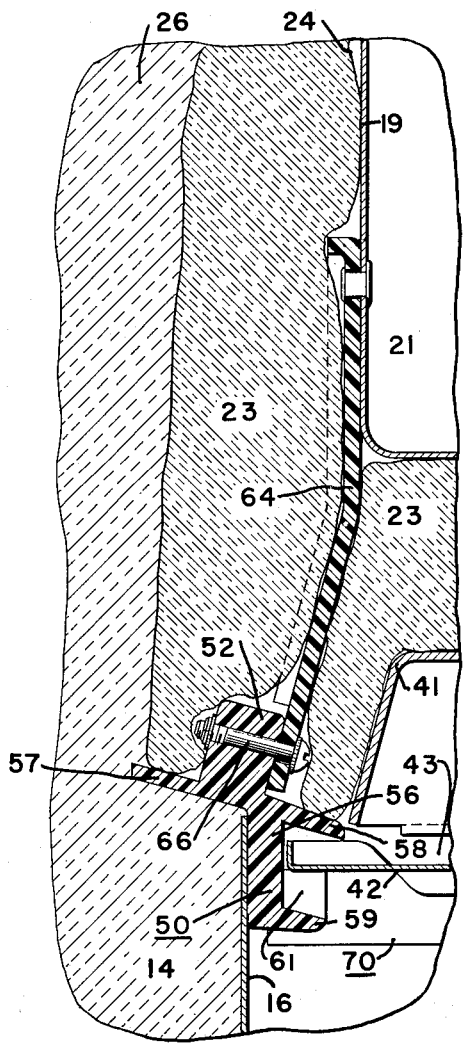
Fig. 5 is an enlarged vertical sectional view taken on the line 5—5 of Fig. 2 showing a bracket secured to the supporting rail and to a compartment forming liner and supported from the upper edge portion of another compartment forming liner.

In the present disclosure I have provided a common means for receiving the frozen food compartment forming can member or liner 19, partition means or ceiling 41 and the pan element 42 and for supporting these elements from the upper edge portion of the open top liner 16. This means comprises a non-metallic and preferably molded plastic rail which is secured to and extends along the sides and back of the upper edges of liner 16. The molded plastic rail may be formed as a single unit or piece but, for simplicity and cost of molds, facilitating shipment to refrigerator cabinet manufacturers and convenience in assembly, is preferably composed of three separate sections or pieces including two sides and a back. Referring now to Fig. 6, wherein a detail side view of one of the side pieces of the rail is shown, it will be noted that this piece, generally represented by the reference character 50, includes or has two pairs of apertured bosses 51 and 52 disposed or formed integrally thereon at slightly different elevations relative to one another. This side rail piece 50 is also provided with a plurality of counterbored mounting openings 53 which receive bolts 54 (see Fig. 3) for securing the same to the upper edge portion of the open top liner 16. Referring to Figs. 3, 4 and 5, it will be noted that the vertical cross-sectional contour of side piece 50 is of substantially T-shape and includes the vertical mounting part 56 and an inclined or angled top or trough forming part providing the flange 57 extending outwardly of one side of part 56 beyond the side walls of can member 19 and flange 58 extending outwardly of the other side of part 56 into the unfrozen food compartment 17. An integral inclined lip 59 at the bottom of the vertical mounting part 56 of rail piece 50 forms or provides a guide for slidably supporting the pan-like element 42 from the opposed side pieces of the rail. Both the right-hand side piece and the left-hand side piece of the rail employed in the present structure are similar in construction and cross-sectional contour. The lips 59 on the opposed side pieces of the rail terminate short of the rear end thereof and have a raised portion 61 at their rear ends (see Fig. 6). This raised portion 61 forms a cam for elevating the down turned back edge of pan-like element 42 over the baffle 44, located in front of evaporator 18, during the act of sliding element 42 in place on the guide lips 59 in overlapping relation to baffle 44 as shown in Fig. 2. Referring now to Figs. 2 and 5, it will be noted that an upright bracket 64, preferably of molded plastic material, is secured to the pair of bosses 52 on each of the opposed side rail pieces by bolts or the like 66 (see Fig. 5). These brackets 64 are riveted or otherwise suitably secured to the side walls of can member or liner 19 and support the frozen food compartment 21. It is also to be noted that ceiling or partition 41 has its depending sides supported from the side rail pieces, such as piece 50, by bolts or the like 67 (see Fig. 4) located in the aperture of the bosses 51. In order to accomplish the objects of the present invention, it is to be understood that partition 41, side pieces 50 of the rail and drain pan element 42 may all be inclined in a direction from the front of the refrigerator cabinet downwardly toward the rear thereof. In Fig. 7 of the drawings, I show a detail side view of the molded plastic back piece of the supporting rail generally represented by the reference character 70. This back piece 70 is of different vertical cross-sectional contour than the side pieces 50 and includes a vertical mounting portion 71 having bolts or screws 72 (see Figs. 2 and 3) extending therethrough and through suitable holes in the upper edge part of the open top liner 16 to rigidly secure the same upon this liner. A lip 73 extending from one side of back piece 70, inwardly of compartment 17, supports the rear edge of partition 41 (see Fig. 8) and forms a trough along this piece provided with spaced apart relief or drain openings 74 (see Figs. 7 and 8). An integral flange 75 on piece 70 extends angularly over and outwardly of the upper edge of liner 16 (see Fig. 8) and provides a drain baffle or trough beneath the rear wall of can member 19 and the bagged insulation 24 adjacent this wall.

In the normal operation of the refrigerating apparatus disclosed evaporator 22, of the refrigerating system associating with cabinet 10, is maintained at a temperature far below 32° F. for the freezing of food products or the storage of frozen foods in compartment 21. The evaporator 18 in the unfrozen food compartment 17 may be maintained at a much higher temperature, say, for example, from 5° F. to 38° F. whereby it will be periodically defrosted. The condensate water drips from evaporator 18 during defrosting thereof onto trough 46 from where it flows down the back wall of compartment 17 to a drain opening (not shown) in the bottom wall of this compartment whereby it is conducted out of compartment 17 and may be evaporated into the atmosphere exteriorly of the refrigerator cabinet 10. The refrigerating effect produced by evaporator 18 cools and causes circulation of air in the unfrozen food compartment 17. The air cooled by evaporator 18 flows downwardly in the rear portion of compartment 17 and thence forwardly and upwardly in the front portion thereof. Some or most of this air enters the flue 43, between ceiling or partition 41 and pan element 42, through the air inlet opening at the front thereof and passes toward the rear of cabinet 10 through this flue and is discharged therefrom by way of the flue outlet opening downwardly in back of baffle 44 and over evaporator 18 to be rechilled and recirculated thereby. Since the freezing evaporator 22 is maintained at a very low temperature, this temperature may cool the ceiling or partition 41 below the temperature of air in compartment 17 and cause moisture to be removed from this air whereupon it will be deposited on the underside of partition 41. The relatively warm air entering flue 43 flows across and in contact with ceiling or partition 41 and prevents moisture accumulating thereon from freezing. Moisture, accumulated on and prevented from freezing by air circulating through flue 43, may drip into the pan element 42 whereupon it will be conducted over the baffle 44 and discharged into the space between this baffle and the back wall of compartment 17. This moisture will be received in trough 46 and directed down the back wall of compartment 17 to the drain in the bottom thereof. Some of the upwardly circulating air in compartment 17 may pass the dividing structure, between compartments 17 and 21, and flow into contact with the closure member 32 of the upper frozen food storage compartment. The outer surface of closure member 32 may, due to the low temperature of compartment 21, be cooled enough to cause moisture to be removed from this air and deposited on surfaces thereof. Any moisture deposited upon the surfaces of closure member 32 and dripping therefrom will fall upon the flat portion 38 of the lip on breaker strip or collar 31. The inclination of the flat portion 38 will drain this moisture into the flue 43, by way of the horizontally elongated openings 37, whereupon it falls upon pan element 42 and is conducted over the rear edge thereof downwardly out of compartment 17 of the refrigerator cabinet 10. The air which bypasses the partitioning structure between the two food storage compartments 17 and 21 and flows into contact with closure member 32 may upon being chilled thereby flow downwardly and into the flue 43 through the openings 37.

Moisture in air which may infiltrate the insulating spaces between the liners 16 and 19 and the cabinet outer walls will find its way into crevices or the like, at the point where the bags 24 abut one another and walls of can member 19, to surfaces of the freezing evaporator 22 and walls of liner 19. This moisture will condense and freeze on such cold metal surfaces of evaporator 22 and liner 19. Although evaporator 22 is intended to at all times be maintained below 32° F. and never defrosted, there are times when the refrigerating system associated with cabinet 10 will be rendered inoperative as hereinbefore described. I construct the present refrigerator in such a manner that melting of frost or ice in the insulation space about evaporator 22 will do no harm since it is drained therefrom and caused to flow to the exterior of cabinet 10. For example, should the temperature of freezing evaporator 22 rise above 32° F., the frost or ice thereon, on liner 19 and on the bags 24 adjacent thereto, will melt and the resulting water will flow along the bags upon the inclined ceiling or partition 41 and upon the trough portion of the rail formed by the flanges 57 and 58 on opposite rail pieces 50 and onto the flange 75 of the rail back piece 70. Water flowing from the sides of ceiling 41 runs down the flanges 58 into the pan element 42 which conducts the same over baffle 44 into trough 46 and down the back wall of compartment 17 to the cabinet drain opening. Water dripping onto the flange 75 on back rail piece 70 and water flowing off the rear edge of ceiling or partition 41 is received by the lip 73 and conducted, by way of the relief or drain openings 74, downwardly along the back wall of liner 16 to the cabinet drain.

It should, in view of the foregoing, be apparent that I have provided an improved multiple compartment household refrigerator wherein a positive and efficient air circulation is established in one of the compartments and wherein the cabinet is prevented from becoming damaged or deteriorated by melting of frost or ice from outer surfaces of a frozen food compartment therein. My invention provides an effective manner of removing condensate water from an unfrozen food storage compartment of a refrigerator cabinet under normal operating conditions and of removing water from the cabinet should the freezing evaporator associated with the frozen food compartment be accidentally defrosted. My improved structure provides for the support of a frozen food compartment and of other partitioning elements intermediate this compartment and an unfrozen food storage compartment from an upper edge portion of an open top liner forming walls of the unfrozen food compartment.

While the form of embodiment of the invention as herein disclosed constitutes a preferred form, it is to be understood that other forms might be adopted as may come within the scope of the claims which follow.

What is claimed is as follows:

1. A refrigerating apparatus comprising, a cabinet having outer walls forming a chamber therein, said chamber presenting a forwardly directed access opening, a door normally closing said chamber access opening, an open top liner disposed in said chamber and spaced from said cabinet outer walls, insulating material in the space between said cabinet outer walls and said liner, the open top of said liner being located a substantial distance below the top wall of said cabinet and forming an unfrozen food storage compartment in the lower portion of said cabinet, a can-like member disposed in said chamber above the open top of said liner forming a frozen food storage compartment in the upper portion of said cabinet, said can-like member being spaced from said cabinet outer walls, insulating material filling the space between said cabinet outer walls and said can-like member, said frozen food compartment having an access opening facing said chamber door, a closure member within said chamber normally closing the access opening of said frozen food compartment, a partition spaced below the bottom wall of said can-like member, insulating material filling the space between the bottom wall of said can-like member and said partition, a first means for refrigerating said frozen food storage compartment, a second means for refrigerating said unfrozen food storage compartment, a pan-like element substantially coextensive with said partition and spaced therebelow, said pan-like element forming the top wall of said unfrozen food compartment and a lower wall of a horizontal flue beneath said partition, said second refrigerating means being located in said unfrozen food storage compartment and exposed to air therein for cooling and causing circulation thereof, said flue being provided with an air inlet opening and an air outlet opening spaced therefrom, at least some of the air circulating within said unfrozen food storage compartment flowing through said flue along and in contact with said partition, the front edge of said can-like member and the front edge of said partition being secured to and spaced from one another by a non-metallic breaker strip, said breaker strip having a lip projecting forwardly of said can-like member and forming a trough beneath said frozen food compartment access opening closure member for receiving condensate water therefrom, and said trough being provided with an opening for draining condensate water received therein into said pan-like element.

2. A construction as defined in claim 1 wherein a non-metallic rail secured to the upper edge portion of the open top liner forms a common support for the can-like member, the partition and the pan-like element.

3. A construction as defined in claim 1 wherein a non-metallic rail secured to the upper edge portion of the open top liner in addition to forming a common support for the can-like member, the partition and the pan-like element also receives condensate water from walls of the frozen food compartment and from the space thereabout and directs the same into the unfrozen food compartment.

4. A refrigerating apparatus comprising, a cabinet having outer walls forming a chamber therein, said chamber presenting a forwardly directed access opening, a door normally closing said chamber access opening, an open top liner disposed in said chamber and spaced from said cabinet outer walls, insulating material in the space between said cabinet outer walls and said liner, the open top of said liner being located a substantial distance below the top wall of said cabinet and forming an unfrozen food storage compartment in the lower portion of said cabinet, a can-like member disposed in said chamber above the open top of said liner forming a frozen food storage compartment in the upper portion of said cabinet, said can-like member being spaced from said cabinet outer walls, insulating material filling the space between said cabinet outer walls and said can-like member, said frozen food compartment having an access opening facing said chamber door, a closure member within said chamber normally closing the access opening of said frozen food compartment, a partition spaced below the bottom wall of said can-like member, insulating material filling the space between the bottom wall of said can-like member and said partition, a first means for refrigerating said frozen food storage compartment, a second means for refrigerating said unfrozen food storage compartment, a pan-like element substantially coextensive with said partition and spaced therebelow, said pan-like element forming the top wall of said unfrozen food compartment and a lower wall of a horizontal flue beneath said partition, a non-metallic rail secured to the upper edge portion of said open top liner and extending around the sides and back thereof, said rail having a lip projecting inwardly of each of the side walls of said unfrozen food storage compartment, and the lips on said rail forming guides slidably supporting said pan-like element therefrom.

5. A refrigerating apparatus comprising, a cabinet having outer walls forming a chamber therein, said chamber presenting a forwardly directed access opening, a door normally closing said chamber access opening, an open top liner disposed in said chamber and spaced from said cabinet outer walls, insulating material in the space between said cabinet outer walls and said liner, the open top of said liner being located a substantial distance below the top wall of said cabinet and forming an unfrozen food storage compartment in the lower portion of said cabinet, a can-like member disposed in said chamber above the open top of said liner forming a frozen food storage compartment in the upper portion of said cabinet, said can-like member being spaced from said cabinet outer walls, insulating material filling the space between said cabinet outer walls and said can-like member, said frozen food compartment having an access opening facing said chamber door, a closure member within said chamber normally closing the access opening of said frozen food compartment, a partition spaced below the bottom wall of said can-like member, insulating material filling the space between the bottom wall of said can-like member and said partition, a first means for refrigerating said frozen food storage compartment, a second means for refrigerating said unfrozen food storage compartment, a pan-like element substantially coextensive with said partition and spaced therebelow, said pan-like element forming the top wall of said unfrozen food compartment and a lower wall of a horizontal flue beneath said partition, a non-metallic rail secured to the upper edge portion of said open top liner and extending around the sides and back thereof, said rail having a lip projecting inwardly of each of the side walls of said unfrozen food storage compartment, said lips on said rail forming guides slidably supporting said pan-like element therefrom, and the upper part of said rail along the side walls of said unfrozen food compartment being exposed to the space above said partition and formed to provide an inclined surface for receiving condensate water from said can-like member and directing the same into said pan-like element.

6. A refrigerating apparatus comprising, a cabinet having outer walls forming a chamber therein, said chamber presenting a forwardly directed access opening, a door normally closing said chamber access opening, an open top liner disposed in said chamber and spaced from said cabinet outer walls, insulating material in the space between said cabinet outer walls and said liner, the open top of said liner being located a substantial distance below the top wall of said cabinet and forming an unfrozen food storage compartment in the lower portion of said cabinet, a can-like member disposed in said chamber above the open top of said liner forming a frozen food storage compartment in the upper portion of said cabinet, said can-like member being spaced from said cabinet outer walls, insulating material filling the space between said cabinet outer walls and said can-like member, said frozen food compartment having an access opening facing said chamber door, a closure member within said chamber normally closing the access opening of said frozen food compartment, a partition spaced below the bottom wall of said can-like member, insulating material filling the space between the bottom wall of said can-like member and said partition, a first means for refrigerating said frozen food storage compartment, a second means for refrigerating said unfrozen food storage compartment, a pan-like element substantially coextensive with said partition and spaced therebelow, said pan-like element forming the top wall of said unfrozen food compartment and a lower wall of a horizontal flue beneath said partition, a non-metallic rail secured to the upper edge portion of said open top liner and extending around the sides and back thereof, means connected to said rail and to said can-like member for supporting said frozen food compartment can-like member from said open top liner, said rail having a lip projecting inwardly of said unfrozen food storage compartment from the side walls thereof, and the lips on said rail forming guides slidably supporting said pan-like element therefrom.

7. A refrigerating apparatus comprising, a cabinet having outer walls forming a chamber therein, said chamber presenting a forwardly directed access opening, a door normally closing said chamber access opening, an open top liner disposed in said chamber and spaced from said cabinet outer walls, insulating material in the space between said cabinet outer walls and said liner, the open top of said liner being located a substantial distance below the top wall of said cabinet and forming an unfrozen food storage compartment in the lower portion of said cabinet, a can-like member disposed in said chamber above the open top of said liner forming a frozen food storage compartment in the upper portion of said cabinet, said can-like member being spaced from said cabinet outer walls, insulating material filling the space between said cabinet outer walls and said can-like member, said frozen food compartment having an access opening facing said chamber door, a closure member within said chamber normally closing the access opening of said frozen food compartment, a partition spaced below the bottom wall of said can-like member, insulating material filling the space between the bottom wall of said can-like member and said partition, a first means for refrigerating said frozen food storage compartment, a second means for refrigerating said unfrozen food storage compartment, a pan-like element substantially coextensive with said partition and spaced therebelow, said pan-like element forming the top wall of said unfrozen food compartment and a lower wall of a horizontal flue beneath said partition, a non-metallic rail secured to the upper edge portion of said open top liner and extending around the sides and back thereof, said partition and said can-like member being secured to said rail to support the same from said open top liner, said rail having a lip projecting inwardly of each of the side walls of said unfrozen food storage compartment, and the lips on said rail forming guides slidably supporting said pan-like element therefrom.

8. A refrigerating apparatus comprising, a cabinet having outer walls forming a chamber therein, said chamber presenting a forwardly directed access opening, a door normally closing said chamber access opening, an open top liner disposed in said chamber and spaced from said cabinet outer walls, insulating material in the space between said cabinet outer walls and said liner, the open top of said liner being located a substantial distance below the top wall of said cabinet and forming an unfrozen food storage compartment in the lower portion of said cabinet, a can-like member disposed in said chamber above the open top of said liner forming a frozen food storage compartment in the upper portion of said cabinet, said can-like member being spaced from said cabinet outer walls, insulating material filling the space between said cabinet outer walls and said can-like member, said frozen food compartment having an access opening facing said chamber door, a closure member within said chamber normally closing the access opening of said frozen food compartment, a partition spaced below the bottom wall of said can-like member, insulating material filling the space between the bottom wall of said can-like member and said partition, a first means for refrigerating said frozen food storage compartment, a second means for refrigerating said unfrozen food storage compartment, a pan-like element substantially coextensive with said partition and spaced therebelow, said pan-like element forming the top wall of said unfrozen food compartment and a lower wall of a horizontal flue beneath said partition, said second refrigerating means being in the form of a plate type evaporator mounted on the back wall of said unfrozen food compartment in spaced relation thereto for cooling and causing circulation of air in said unfrozen food compartment in a direction downwardly along said back wall thereof and upwardly along said chamber door, said flue being provided with an air inlet opening adjacent said chamber door and an air outlet adjacent said back wall of said unfrozen food compartment, and at least some of the air circulating within said unfrozen food storage compartment flowing through said flue along and in contact with said partition.

9. A construction as defined in claim 8 wherein a non-metallic rail is secured to the upper edge portion of the open top liner and forms a common support for the can-like member, the partition and the pan-like element.

10. A construction as defined in claim 8 wherein a non-metallic rail secured to the upper edge portion of the open top liner in addition to forming a common support for the can-like member, the partition and the pan-like element also receives condensate water from walls of the frozen food compartment and from the space thereabout and directs the same into the unfrozen food compartment.

11. A refrigerating apparatus comprising, a cabinet having outer walls forming a chamber therein, said chamber presenting a forwardly directed access opening, a door normally closing said chamber access opening, an open top liner disposed in said chamber and spaced from said cabinet outer walls, insulating material in the space between said cabinet outer walls and said liner, the open top of said liner being located a substantial distance below the top wall of said cabinet and forming an unfrozen food storage compartment in the lower portion of said cabinet, a can-like member disposed in said chamber above the open top of said liner forming a frozen food storage compartment in the upper portion of said cabinet, said can-like member being spaced from said cabinet outer walls, insulating material filling the space between said cabinet outer walls and said can-like member, said frozen food compartment having an access opening facing said chamber door, a closure member within said chamber normally closing the access opening of said frozen food compartment, a partition spaced below the bottom wall of said can-like member, insulating material filling the space between the bottom wall of said can-like member and said partition, a first means for refrigerating said frozen food storage compartment, a second means for refrigerating said unfrozen food storage compartment, a pan-like element substantially coextensive with said partition and spaced therebelow, said pan-like element forming the top wall of said unfrozen food compartment and a lower wall of a horizontal flue beneath said partition, said second refrigerating means being in the form of a plate type evaporator mounted on the back wall of said unfrozen food compartment in spaced relation thereto for cooling and causing circulation of air in said unfrozen food compartment in a direction downwardly along said back wall thereof and upwardly along said chamber door, said flue being provided with an air inlet opening adjacent said chamber door and an air outlet adjacent said back wall of said unfrozen food compartment, at least some of the air circulating within said unfrozen food storage compartment flowing into the front of said flue along and in contact with said partition and discharged out of the back of said flue onto and over said evaporator, the front edge of said can-like member and the front edge of said partition being secured to and spaced from one another by a non-metallic breaker strip, said breaker strip having a integral lip projecting forwardly of said can-like member and forming a trough beneath said frozen food compartment access opening closure member for receiving condensate water therefrom, and said trough being provided with an opening for draining condensate water received therein into said pan-like element.

12. A construction as defined in claim 11 wherein a non-metallic rail secured to the upper edge portion of the open top liner forms a common support for the can-like member, the partition and the pan-like element.

13. A refrigerating apparatus comprising a cabinet having outer walls forming a chamber therein, an open top liner disposed in said chamber and spaced from said cabinet outer walls, the open top of said liner being positioned a substantial distance below the top wall of said cabinet and forming an unfrozen food storage compartment in the lower portion of said cabinet, means in the space between said cabinet outer walls and said liner for insulating said unfrozen food compartment, a second liner in said chamber disposed wholly above and carried by said open top liner, said second liner forming the top, bottom, back and side walls of a frozen food storage compartment in the upper portion of said cabinet, said compartments each presenting a forwardly facing access opening, doors for the access opening of said compartments, said second liner being spaced from said cabinet outer walls, a partition spaced below the bottom wall of said frozen food compartment, means in the space between said cabinet outer walls and said second liner and in the space between the bottom wall of said second liner and said partition for insulating said frozen food compartment, at least a portion of said last named means including insulating material in hermetically sealed bags surrounding said second liner, means for refrigerating said frozen food storage compartment, another means for refrigerating said unfrozen food storage compartment, rail means about the back and sides of the opening in said open top liner, said rail means including a molded plastic member having a first part secured to the upper edge of said open top liner, a second part formed integral with said first part supporting said partition and a third part formed integral with said first and said second parts thereof, and said third part of said molded plastic member being in the form of an inclined flange extending over the upper edge of said open top liner in exposed relation to the space above said partition for receiving condensate water from said second liner and from surfaces of said sealed bags and directing the water into said unfrozen food storage compartment.

14. A refrigerating apparatus comprising a cabinet having outer walls forming a chamber therein, an open top liner disposed in said chamber and spaced from said cabinet outer walls, the open top of said liner being positioned a substantial distance below the top wall of said cabinet and forming an unfrozen food storage compartment in the lower portion of said cabinet, means in the space between said cabinet outer walls and said liner for insulating said unfrozen food compartment, a second liner in said chamber disposed wholly above and carried by said open top liner, said second liner forming the top, bottom, back and side walls of a frozen food storage compartment in the upper portion of said cabinet, said compartments each presenting a forwardly facing access opening, doors for the access opening of said compartments, said second liner being spaced from said cabinet outer walls, a partition spaced below the bottom wall of said frozen food compartment, means in the space between said cabinet outer walls and said second liner and in the space between the bottom wall of said second liner and said partition for insulating said frozen food compartment, at least a portion of said last named means including insulating material in hermetically sealed bags surrounding said second liner, means for refrigerating said frozen food storage compartment, another means for refrigerating said unfrozen food storage compartment, an element substantially coextensive with and located in spaced relation below said partition, said element forming the ceiling of said unfrozen food compartment and the lower wall of a flue beneath said partition, said flue being provided with an air inlet and an air outlet spaced therefrom for permitting flow of some of the air within said unfrozen food storage compartment therethrough along and in contact with said partition, rail means secured to the upper edge of said open top liner at the back and sides thereof, said partition being secured to said rail means, the upper part of said rail means having an inclined flange thereon extending over the upper edge of said open top liner in exposed relation to the space above said partition for receiving condensate water from said second liner and from surfaces of said sealed bags and directing the same into said unfrozen food storage compartment, the front edge of said second liner and the front edge of said partition being secured together and spaced from one another by a non-metallic breaker strip, and said breaker strip having a lip projecting forwardly thereof below the door for the access opening of said frozen food storage compartment for receiving condensate water from said door and directing the same onto said flue lower wall forming element.

References Cited in the file of this patent

UNITED STATES PATENTS

| 2,498,028 | Clerc | Feb. 21, 1950 |
| 2,509,610 | Philipp | May 30, 1950 |
| 2,665,562 | Pedigo | Jan. 12, 1954 |